Nov. 4, 1958     E. F. ENGSTROM     2,858,605
CITRUS FRUIT PEELING DEVICE
Filed July 9, 1957     2 Sheets-Sheet 1
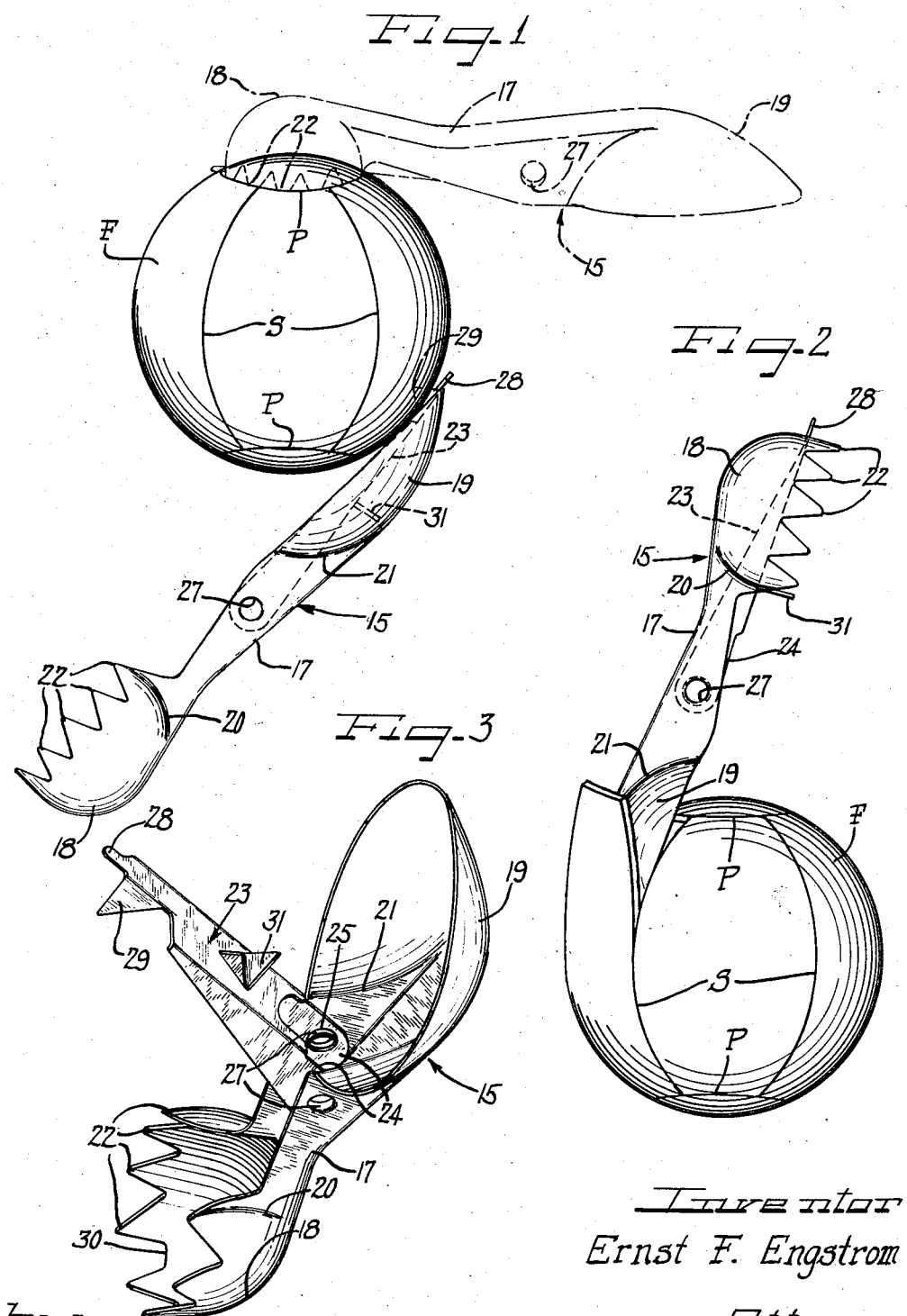
Inventor
Ernst F. Engstrom

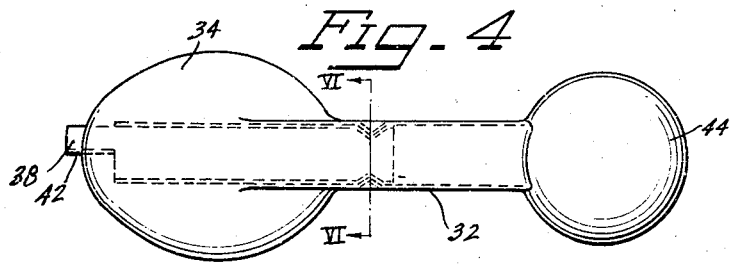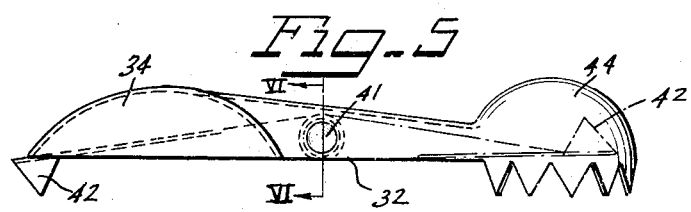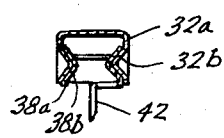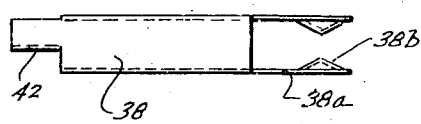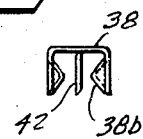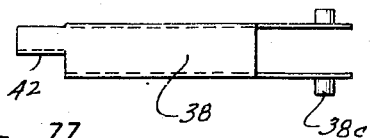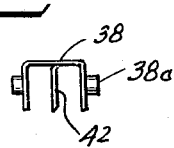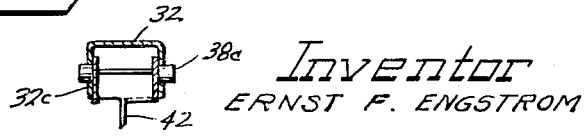

United States Patent Office 2,858,605
Patented Nov. 4, 1958

2,858,605

CITRUS FRUIT PEELING DEVICE

Ernst F. Engstrom, Maywood, Ill.

Application July 9, 1957, Serial No. 671,118

11 Claims. (Cl. 30—24)

The present invention relates to improvements in devices for assisting in the manual removal of the rind or peel of fruit and more particularly citrus fruit such as oranges and grapefruits.

Removal of the peel from citrus fruit such as oranges and grapefruits, by hand is an awkward and difficult operation where the hands are unaided. In addition to the difficulty in stripping the peel, there is the liability of breaking into the cellular, meat portion of the fruit, with consequent loss of juice and the attendant untidiness.

It is, accordingly, an important object of the present invention to provide a new and improved device for use in peeling fruits having a relatively thick, separable peel over a containing membrane or skin structure, such as citrus fruits.

Another object of the invention is to provide a novel hand tool which may be easily and rapidly operated to remove the peel from citrus fruit such as oranges in a neat manner and with minimum tendency toward crushing or tearing of the meat or the enclosing inner skin or membrane of the fruit enclosing the meat segments.

A further object of the present invention is to provide a citrus fruit peeling device which is especially suitable for scoring and removing the peel of a citrus fruit sectionally.

Other objects, features and advantages of the present invention will be readily apparent from the following detailed description of certain preferred embodiments thereof, taken in conjunction with the accompanying drawings, in which:

Figure 1 is a side elevational view of a device according to the present invention showing it in association with an orange in the course of scoring the orange peel preparatory to removal of the peel;

Figure 2 is a side elevational view of the device showing the same in process of removing the orange peel after it has been scored;

Figure 3 is a pictorial illustration of the device;

Figure 4 is a plan view of a modification of the device;

Figure 5 is a side elevational view of the device of Figure 4;

Figure 6 is a transverse sectional elevational view taken substantially on the line VI—VI of Figures 4 and 5;

Figure 7 is a plan view of the swingable scoring finger or arm of the device of Figures 4 and 5;

Figure 8 is an end view of the finger or arm member of Figure 7;

Figure 9 is an end view similar to Figure 8 but showing a modification;

Figure 10 is a top plan view of the device of Figure 9; and

Figure 11 is a transverse sectional detail view similar to Figure 6 but showing the modification of Figures 9 and 10.

Having reference to Figures 1, 2 and 3, a manual fruit peeling device or tool 15 is constructed and arranged for scoring the peel of a whole orange or similar citrus fruit F and then stripping the peel from the orange by convenient sections or segments. To this end, the device includes an elongated body frame portion 17 serving conveniently as a handle and having integrally at one end thereof a dome-shaped portion or hollow knob of generally semi-spherical head shape 18, and at the opposite end a generally spoon-shaped peel stripper 19. By preference the handle 17, the knob 18 and the stripper spoon 19 are all constructed unitarily from a single piece of sheet material such as suitable gauge stainless steel or like strip or sheet metal stock. For maximum strength and rigidity while yet affording lightweight and easily cleanable open structure, the handle body 17 is of generally channel-shape cross-section with the groove or channel defined thereby opening into and merging with the hollow interiors of the knob 18 and the spoon 19. The knob 18 is wider than the handle body 17 and is connected thereto at the sides by merging reinforcing shoulders 20 while the top of the knob and the back or web of the handle 17 merge smoothly. Similarly, the top or crown or back of the spoon 19 merges smoothly with the top or web or back of the handle 17 while the sides of the spoon which is substantially wider than the handle 17 and preferably even wider than the knob 18, merges with the sides defining the handle 17 on reinforcing juncture rib shoulders 21.

At its inner periphery, the knob-head 18 is provided with a circular series of cutting teeth 22 of generally sawtooth outline projecting generally axially in the opposite direction from the dome-shape of the knob-head and of a depth which will enable the teeth to penetrate even the thickest citrus fruit skin. As indicated in dot-dash outline in Figure 1, the teeth 22 are adapted to be pressed into the pole end portions of the citrus fruit F by applying manipulative hand pressure to the smoothly rounded dome of the knob-head 18 and then by utilizing the handle 17 as a lever, since it extends transversely to the axis of the circle defined by the teeth, applying circular leverage to thereby rotate the teeth for cutting a circular groove P. This is effected at both poles of the fruit to define circular caps that may be immediately removed or may be left in place until the remainder of the peel is removed.

For scoring or slitting the peel of the fruit F between the pole caps, the device 15 is provided with cutting or slitting means. Herein this comprises conveniently a cutting member or arm 23 which may be formed up from similar, though preferably lighter gauge, material as the principal component, already described, of the device. In a convenient form, the cutting arm 23 is generally channel-shape and of a width to fit in free slidable relation within the channel defined by the handle portion 17 of the device. In over-all length, the cutting arm 23 is just a little longer than half the over-all length of the principal component of the device including the arm 17 and the opposite functional head portions 18 and 19 considered as a unit.

For ready assembly purposes, the arm member 23 is provided adjacent one end with a pair of generally parallel stiffly resiliently flexible side wall journal flange extensions 24 which are provided with respective coaxial circular bearing apertures 25 located adjacent to the free ends of the bearing flanges and engageable at the bearing edges defining the same with inturned respective coaxial journal protrusions 27 pressed from the side walls defining the handle portion 17 and generally in the form of short, substantially cylindrical flanges. Assembly of the arm 23 is easily effected by pressing the side wall flanges providing the bearing portions 24 flexibly toward one another to clear the tips of the journal projections 27 and moving the bearing portions 24 into registration of the bearing holes 25 with the journals 27 and allowing the bearing portions to spring apart with the journals 27 projecting through the bearing holes and thus connecting the arm for pivotal swinging movement about the journals 27. By having the bearing flange portions 24 normally set to a slightly greater width than the inside width between the side wall flanges of the handle portion 17, the sprung apart connected relationship of the bearing flange portions will effect a frictional, slightly binding pressure against the handle portion side walls for desirably holding the arm 23 in place in the position into which manipulated, but without affording undue resistance to pivotal swinging thereof from one position to the other.

For fruit peel scoring or sub-dividing purposes, the cutting arm 23 is arranged to be swung into cooperative relation positioned within and in engagement with the peeling spoon head 19. To this end, the distal end portion of the arm 23 is provided with a stop extremity or tip portion or extension 28 which is engageable against the tip edge of the spoon head 19 as best seen in Figure 1, so as to provide a solid backing for a cutting or slitting tooth 29 which is preferably formed in a plane substantially on the longitudinal median plane of the arm 23, of generally sawtooth shape, and projecting toward the inside of the channel defined by the arm 23, that is away from the back of the web portion of the arm, and in the same direction as the bearing flange sides of the arm. Thereby, when the arm is in the slitting position with the stop terminal 28 engaging against the tip edge of the spoon head 19, the slitting or cutting tooth 29 projects beyond the spoon edge to the inner side of the spoon a sufficient distance to be pressed into a citrus fruit peel of maximum thickness so that starting at either of the pole scorings P, longitudinal severance or separating scores or cuts S can be made by drawing the device 15 longitudinally from one to the other of the circular end or pole scorings P. In doing so, the edges of the bearing flange side walls of the arm 23, which are tapered from the bearing portions 24 to the tip extremity so as to be, in general, parallel during the slitting action with the edge defining the spoon head 19, serve as convenient depth gauges, substantially as shown in Figure 1 so as to avoid scoring too deeply and thus cutting into the membrane that protects the meat of the fruit inside of the pulpy skin. Since the back of the device 15 is smooth it can be comfortably cradled in the palm of the hand, with the fingers grasping either the spoon head 19, or the handle 17, or both and with possibly one or more fingers bearing against the shoulder or shoulders 20 provided by the circular scoring knob 18 to provide drag thrust for pulling the slitter tooth 29 through the orange skin.

After the orange or like citrus fruit skin has been grooved or slit along the lines S into appropriate sections or segments, the slitter arm 23 is swung away from the spoon head 19 and into an out of the way position generally within the slitter head 18 and the adjacent portion of the handle 17, substantially as seen in Figure 2. This frees the spoon head 19 for use in stripping the respective sections of the fruit peel sub-divided by the terminal or pole slits P and the longitudinal slits S, substantially as indicated in Figure 2. In an average size orange, for example, the orange skin may be sub-divided into about six of the longitudinal sections for ready stripping by means of the stripper spoon 19. In effecting such stripping, the rounded knob 18 serves as a convenient pressure receiving surface from the palm of the user's hand, supplemented if preferred by finger pressure against the shoulders 21 at juncture of the stripper spoon 19 with the sides of the handle 17. Thereby, controlled thrust is conveniently imposed toward the tip of the stripper spoon.

Instead of completely stripping the several sections into which the fruit peel has been separated, it may be desired to partially loosen the sections as flaps which can then be folded back onto the orange to protect the meat and keep the same from drying out until it is desired to finish the peeling and eat the fruit. This is a substantial convenience for those who must carry their lunch.

Not only does the stop terminal extension 28 serve as a convenient handle for moving the slitter arm 23 with respect to the stripper spoon head 19, but also with respect to the slitter head 18. To this end, when the arm is collapsed into the slitter head 18, the terminal 28 projects between a pair of the slitter teeth 22 on the longitudinal axis of the device and comes to rest on a stop shoulder 30 provided therefor at the base of the adjacent teeth as best shown in Fig. 3. Such stopping engagement of the stop extension and handle 28 is also advantageous in that it positively locates the back surface of the arm 23 in a plane substantially coincident with the roots or base portions of the slitter teeth 23 so that the back of the arm will serve as a depth gauge to avoid over extension of the teeth 22 into the citrus fruit.

In order to fill the gap in the annular series of slitter teeth 22 through which the arm 23 is swung at the handle side of the slitter knob 18, the arm 23 is preferably provided with a supplementary slitter tooth 31 which is preferably struck out and bent up therefrom as best seen in Fig. 3 so that in the coaction of the arm 23 with the slitter knob 18 as shown in Fig. 2, the supplemental tooth 31 will cooperate to complete the annular series of slitter teeth and thus facilitate forming of the circular slits P with a minimum rotary motion of the slitter knob 18.

In the slightly modified form of the invention shown in Figures 4–8, the device is provided with an elongated central longitudinal handle 32 at one end of which is a peeling spoon-shaped head 34. Carried by the handle 32 is a pivoted cutting member or arm 38 which is provided with preferably parallel side walls having free resiliently flexible similar bearing extensions 38a provided with inwardly extending supporting pivot bearing bosses 38b providing bearing sockets opening outwardly and receptive of pressed in complementary journal bosses 41 formed coaxially in the side walls defining the handle 32. By having the bearing extensions 38a pressed outwardly, similarly as described in connection with the bearing extensions 24 of the device 15, frictional retention of the arm 38 is effected to substantially retain it in any adjusted position.

For fruit skin slitting purposes, the arm 38 is provided at its distal extremity with a longitudinal median plane slitter tooth 42 on the terminal portion of the arm which backs up against the terminal edge of the peeler spoon 34 as best seen in Figs. 4 and 5 for slitting purposes.

When the spoon 34 is to be used for peeling the orange or other citrus fruit, the arm 38 is pivotally swung to an out of the way position within a hollow slitter knob 44 at the opposite end of the handle 32 and provided with slitter teeth similar to the slitter teeth 22 of the device 15.

In the modification of Figures 9, 10 and 11, a slitter arm 38 of generally similar construction as already described is shown wherein journals 32c are pressed out in the bearing end portions of the side walls of the arm for engagement within suitable bearing apertures in the side walls defining the handle 32 as shown in Figure 11.

This application is a continuation-in-part of my application Serial No. 522,712 filed July 18, 1955 which issued as Letters Patent No. 2,815,570 on December 10, 1957.

It will be understood that modifications and variations may be effected without departing from the scope of the novel concepts of the present invention.

I claim as my invention:

1. In a citrus fruit peeling device, a dome-shaped portion accommodating the palm of a manipulating hand for applying manual pressure on the dome, a manipulating handle projecting from the side of the dome and extending transversely to the axis thereof, and a peel slitting cutter member having means pivotally attaching the same to said handle and having a distal end portion cutting element projecting from one side thereof, said cutting member being pivotally movable into operating position extended away from said dome and with said cutting element projecting away from the handle for peel slitting operation, and being pivotally movable into position toward said dome and into the hollow interior thereof with said cutting element disposed entirely within the hollow of the dome while said slitting cutter is in said inactive position within the dome.

2. In a device especially adapted for peeling citrus fruit, a handle having at one end thereof a portion with a forward edge and with the back of said portion arched toward one side of the handle, and a pivoted slitter pivotally connected to said handle spaced from said portion and swingable relative to the handle and portion on the opposite side of the handle, said slitter being of a length greater than the distance from said pivot to said edge so that the slitter is swingable into position with its distal end portion lying against said edge and projecting therebeyond, said slitter having a slitting tooth on said distal end portion and projecting away from said edge when the slitter bears against the edge, whereby pressure applied through said handle and portion to said distal end portion of the slitter is effective for slittingly penetrating said tooth into a citrus fruit skin for slitting the same.

3. In a citrus fruit slitting device, a handle member hollow to one side thereof and having at one end thereof a backing member, and an elongated slitter member internestably mounted in said handle and movable from an internested position in said handle into slitting position with a cutting end portion of the slitter bearing for slitting thrusting pressure against said member but movable therefrom into said internested position.

4. A device as defined in claim 3 wherein the handle is of hollow channel shape structure and the slitter is also of generally complementary channel shape.

5. A device as defined in claim 3 wherein said handle and slitter are pivotally connected with one of them having bearing means thereon and the other having journal means coactive therewith and the pivotally connected portions of the handle and slitter engage frictionally to maintain the slitter and handle in the desired relative position.

6. In a slitting device for citrus fruit, a member having a generally channel shaped handle, a slitter of generally channel shape internestably fitting within the channel of the handle, and means movably connecting the slitter and handle for movement of the slitter into backed up relation to said member from an out of the way position relative to the member.

7. In a citrus fruit peeling device, a supporting structure, and an elongated slitter member of generally U-shaped cross-section having side walls attached to said supporting structure and a slitting end portion including a projection extending beyond the ends of said side walls and having a slitting tooth extending therefrom with a surface of said portion on the opposite side from said tooth engageable against said supporting structure for applying pressure to said slitting tooth for slittingly penetrating a citrus fruit skin.

8. In combination in a fruit peeling device, an elongated handle portion having at one end a head member and at the other end a knob, and a slitter arm pivotally carried by the handle and having a distal end portion arranged in one position to back up against said head member and having a slitting tooth projecting therefrom for longitudinally slitting a citrus fruit peel, said arm being swingable from the head member toward said knob and with the distal end portion supported against the knob and said tooth in an out of the way position in said knob.

9. In combination in a fruit peeling device, an elongated handle portion having at one end a head member and at the other end a knob, and a slitter arm pivotally carried by the handle and having a distal end portion arranged in one position to back up against said head member and having a slitting tooth projecting therefrom for longitudinally slitting a citrus fruit peel, said arm being swingable from the head member toward said knob and with the distal end portion supported against the knob and said tooth in an out of the way position in said knob, said arm having on the distal end portion thereof a handle projection that projects respectively beyond the head member and the knob depending upon which of the member or knob the arm is in engagement.

10. In a citrus fruit peeling device, a supporting structure, and an elongated slitter member of generally U-shaped cross-section having side walls attached to said supporting structure and a slitting end portion including a projection extending beyond the ends of said side walls and having a slitting tooth extending therefrom with a surface of said portion on the opposite side from said tooth engageable against said supporting structure for applying pressure to said slitting tooth for slittingly penetrating a citrus fruit skin, said slitter member presenting edges extending longitudinally away from said slitting tooth and cooperative therewith as depth gauges.

11. In combination in a device of the character described, a generally channel-shaped handle having a head at one end and means at the other end enabling thrust to be applied through the handle toward the head, and a slitter arm of generally channel-shape and having a pair of spaced resiliently flexible bearing flange portions at one end resiliently frictionally engaged within the walls of said channel-shaped handle and pivotally connected thereto, said arm being swingable from a position clear of said head into engagement with the head and in the latter position presenting a slitter tooth projecting beyond the edge of the head for longitudinal slitting of a citrus fruit with the arm backed against the head.

No references cited.